United States Patent [19]

Bühler et al.

[11] 4,065,254

[45] Dec. 27, 1977

[54] PROCESS FOR DYEING AND PRINTING

[75] Inventors: Arthur Bühler, Rheinfelden; Alfred Fasciati, Bottmingen; Karl Schlumpf, Basel, all of Switzerland

[73] Assignee: Ciba-Geigy Corporation, Ardsley, N.Y.

[21] Appl. No.: 687,809

[22] Filed: May 19, 1976

Related U.S. Application Data

[63] Continuation of Ser. No. 373,216, June 25, 1973, abandoned.

[30] Foreign Application Priority Data

June 26, 1972 Germany .............................. 2231245

[51] Int. Cl.² .................... D06P 1/38; C09B 27/00; D06P 3/12
[52] U.S. Cl. .......................................... 8/1 C; 8/1 E; 8/13; 8/21 B; 8/21 C; 8/22; 8/41 A; 8/41 B; 8/41 C; 8/41 D; 8/44; 8/45; 8/46; 8/47; 8/54; 8/54.2
[58] Field of Search ............... 8/46, 13, 44, 45, 13, 8/54.2, 54, 41 B, 1 E, 1 C, 46, 47

[56] References Cited

U.S. PATENT DOCUMENTS 3,471,506  10/1969  Lei ........................................ 260/297
3,729,476  4/1973  Austin et al. ................. 260/295.5 A

FOREIGN PATENT DOCUMENTS 1,275,730  5/1972  United Kingdom.
1,285,339  8/1972  United Kingdom.

*Primary Examiner*—Joseph L. Schofer
*Assistant Examiner*—A. L. Clingman
*Attorney, Agent, or Firm*—Edward McC. Roberts; Prabodh I. Almaula

[57] ABSTRACT

A process for the dyeing and printing of leather and various textile material with developing dyestuffs is described wherein diazo salts and specific 6-membered, heterocyclic coupling components having one ring nitrogen atom especially of the pyridone and pyridine types are applied, the coupling process being independent of the pH-value, i.e. it can be performed with a range of ca. pH 2 to 12, preferably at room temperature so that this is possible not only in alkaline but also in neutral or acid medium, depending on the substrate, and in that it is possible with it to produce with only one of the coupling components by means of variation of diazo salts the whole color range from light yellow to black.

8 Claims, No Drawings

PROCESS FOR DYEING AND PRINTING

This is a continuation of application Ser. No. 373,216, filed on June 25, 1973 now abandoned.

The invention relates to a process for the dyeing and printing of organic materials with developing dyestuffs, whereby these are azo dyestuffs containing, as radical of the coupling component, a 6-membered heterocyclic radical having one ring nitrogen atom, as well as to the organic materials dyed and printed with these developing dyestuffs.

Processes for dyeing and printing with substantive developing dyestuffs have been known for a long time. The first tests [DRP 14950 (1880), GB-PS 2757 (1880), 1638 (1881), 2946 (1882), 2580 (1885)] led to the so-called "ice colour technique", which temporarily played a part in calico printing. 2-Naphthol was used as the coupling component in this method. It was possible to influence the shade of colour by variation of the diazo component. It was not difficult in calico printing to dry the material impregnated with 2-naphthol sodium solution, to then print it with thickened diazo solution, and to wash out the 2-naphthol sodium remaining on the unprinted part. In dyeing, however, it was scarcely possible to dry yarns impregnated with 2-naphthol sodium solution so uniformly that the unfixed 2-naphthol did not migrate from the moister to the drier areas, and that by development with a diazo component an even dyeing could be obtained. The fastness properties of the obtained dyeings and printings were frequently inadequate, particularly with regard to fastness to rubbing, washing, chlorine and light. A disadvantage in application lay in the instability of the alkaline 2-naphthol solution and in the rapid atmospheric oxidation of the impregnated material. An appreciable advancement was brought about by the use of 2,3-oxynaphthoic acid arylamides [DRP 256.999, 261.594] as coupling components. These are appreciably more substantive than 2-naphthol; they are thus absorbed substantively from the alkaline solution onto the cotton fibres. Their solutions and the material impregnated therewith are more stable and the dyeings much faster. The products are insoluble and closely related with the metal-free azo pigments. They are very deeply coloured, extremely pure in shade of colour and have good fastness to light.

By the choice of different amines, numerous arylamides of 2-hydroxy-3-naphthoic acid and a correspondingly high number of different shades of colour can be produced. The diazo components used are diazotised anilines, benzidines, aminodiphenyl ethers, aminodiphenylamines and aminoazobenzenes. The diazonium compounds can be stabilised as salts, e.g. as metal salts.

The determining factor with regard to the further development of this dyestuff class, which surpassed in importance, the old "ice colours", was not only superiority of fastness properties, but also the possibility of production of dyeings on yarn by use of these dyestuffs. Even the most simple of the 2,3-oxynaphthoacetic acid-arylamides, the anilidine, possessed a moderate substantivity of ca. 12%. This substantivity rendered possible the development with diazo solutions also of impregnations not intermediately dried, without loosening of the impregnations from the fibres before coupling. The satisfactory dyeing of yarn as well as of wound packages and loose cotton thus became a possibility. Compared with processes involving the older techniques, this process thus has clear advantages; it has therefore become wisely used in textile dyeing, and still constitutes the most important process for developing dyestuffs.

Nevertheless, the above described process has two considerable disadvantages: At least 2 moles of sodium hydroxide solution per mole of 2,3-oxynaphthoacetic acid-arylamide are required for the dissolving of the naphthols. Moreover, the salts of the naphthols hydrolyse more or less readily depending on the constitution, so that for the said dissolving an excess of sodium hydroxide is necessary. There are used in practice therefore, according to the particular hydrolisation tendency, 2 or more (up to 16) moles of sodium hydroxide solution per mole of naphthol. The naphthol solutions are hence strongly alkaline; and since strong alkaline solutions damage wool fibres, wool cannot be dyed by the described process. A further disadvantage is that, in order to obtain all the desired shades of colour, different coupling components have to be used. The applicable coupling components embrace two types of compounds:

1. o-hydroxy-carboxylic acid-arylamides, for the most part 2,3-oxynaphthoacetic acid arylamides, for all shades except yellow, orange and red, and
2. acylacetic acid-arylamides, which couple on the reactive methylene group for yellow, orange and red shades (in connection with the described process, also these compounds as well as some oxylbenzene-carboxylic acid derivatives of group (1) are designated in practice as "naphthols"). In the case of printings having to contain a yellow and a further non-yellow shade, the application of two coupling components would hence be required. Since moreover in the range of non-yellow shades, such as green, blue, violet, etc., different naphthols are employed, it would be necessary for multicolour printings to use in such cases more than two different coupling components, which, however, cannot be applied together.

It is obvious that the stated disadvantages are of a serious nature. On the one hand, the valuable and quantitatively important wool textiles cannot be dyed or printed by the said process, while, on the other hand, printings cannot be produced which contain yellow together with non-yellow shades, e.g. blue shades. To be able nevertheless to obtain such multicoloured printings, other classes of dyestuffs have to be employed. Thus, for example, a yellow dyeing (yellow ground shade) can be produced with a reactive dyestuff on naphtholated material, and the other desired shades subsequently applied by the printing-on of the appropriate diazo components. However, such a process entails an undesirable additional amount of work, requires an increased use of the dyeing plant and thus renders the dyed textile material more expensive.

The need was therefore present to find a dyeing and printing process for developing dyestuffs which would have the advantages of the known process, yielding, e.g. dyeings having at least equally good fastness properties; by which cotton and wool, and if need be other textile fibres could be equally well dyed; and in which for all shades of colour very few coupling components — as far as possible one only — would be required.

It has now been found that a process substantially satisfying the above outlined requirements is obtained if diazo components and heterocyclic coupling components containing a 6-membered, heterocyclic radical having one ring nitrogen atom are applied, simultaneously or successively in any desired sequence, to the organic material to be dyed or printed, and coupled together, whereby the coupling hence occurs on the organic material to be dyed or printed. Preferably, the heterocyclic coupling component is applied first, and the diazo components subsequently allowed to act on the thus pretreated organic material.

Particularly valuable representatives of the specific coupling components render possible, purely by variation of the diazo component, the obtainment on the organic material of all shades of colour from light-yellow to black, so that complete colour systems of developing dyestuffs containing only one single coupling component can be formulated.

These specific 6-membered, heterocyclic coupling components correspond, in particular, to formula (1)

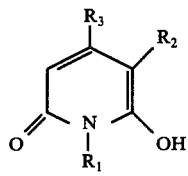
(1)

wherein the substituents $R_1$, $R_2$ and $R_3$ have the given meanings:

$R_1$: hydrogen, an optionally substituted alkyl group such as methyl, ethyl, propyl, isopropyl, butyl, hydroxyethyl or cyanoethyl; or an alkyl group substituted by halogen such as fluorine, chlorine or bromine, hydroxyl, an alkoxy group such as methoxy, ethoxy, propyloxy, isopropyloxy or hydroxyethoxy, a quaternary ammonium group such as the trimethylammonium group, or an acylamino group such as acetylamino, chloroacetylamino or benzoylamino, an acylaminoalkyl group in which the acyl radical is fibrereactive, such as chloroacetylaminomethyl, α,β-dibromopropionylaminoethyl or 2,4-dichlorotriazinyl-(6)-aminoethyl, an aralkyl group such as benzyl, an aryl radical such as phenyl, 1- or 2-naphthyl, 2,5-dichlorophenyl or 3-sulphophenyl, a heterocyclic radical such as the radical of 1-phenyl-3-methyl-pyrazolone-(5) or of pyridine, an alkylene radical which binds the radical of formula (1) with a further similar heterocyclic radical an amino group, e.g. $H_2N$-, an alkylamino, N,N-dialkylamino, N-alkyl-N-arylamino, arylamino group, such as methylamino, N,N-diethylamino, N,N-dicyanoethylamino, phenylamino, N-methyl-N-phenylamino or N,N-diphenylamino.

$R_2$: hydrogen, an alkyl group such as methyl, ethyl, propyl or cyclohexyl, cyano, nitro, nitroso, $H_2N$-, an acylamino group such as acetylamino propionylamino or benzoylamino, and particularly an acylamino group in which the acyl radical is fibrereactive, such as chloroacetylamino, α-bromoacryloylamino, α,β-dibromopropionylamino, 2,4,5-trichloropyrimidyl-(6)-amino, 2,6-difluoro-5-chloropyrimidyl-(4)-amino, 2,2,3,3-tetrafluorocyclobutyl-(1)-carbonylamino, 2,2,3,3-tetrafluorocyclobutyl-(1)-acryloylamino, 2,4-dichlorotriazinyl-(6)-amino or 2-chloro-4-amino-triazinyl-(6)-amino, an alkylcarbonyl or arylcarbonyl group, such as acetyl, propionyl or benzoyl, a sulphonyl group such as methylsulphonyl, an aminosulphonyl group such as N-methylaminosulphonyl or N,N-diethylaminosulphonyl, an alkoxycarbonyl or aryloxycarbonyl radical such as methoxycarbonyl, ethoxycarbonyl, β-ethoxyethoxycarbonyl or phenoxycarbonyl, an aminocarbonyl group such as aminocarbonyl, N-methylaminocarbonyl or phenylaminocarbonyl, a halogen atom such as fluorine, chlorine or bromine, a sulphoalkyl group such as sulphomethyl, 1-sulphoethyl, 1-sulphomethyl, an acylaminomethyl group in which the acyl radical preferably corresponds to the formula CO—R—X wherein R is an alkylene group, preferably a methylene group, and X is a halogen atom, a quaternised amino group or a sulpho group, such as —$COCH_2Cl$, —$COCH_2N^+$ (R'R''R''') or —$COCH_2SO_3H$, a group of the formula

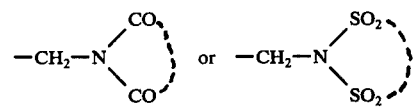

wherein the two —CO— or —$SO_2$— groups are bound in neighbouring position to a preferably 6-membered aromatic ring, the sulpho or carboxy group, a quaternised amino group or a group of the formula

in which the nitrogen atom is part of a 5-membered or preferably 6-membered ring which can contain further hetero atoms such as nitrogen or oxygen atoms, e.g. the radical of pyridine, piperidine or benzimidazole.

$R_3$: hydrogen, an alkyl group such as methyl, ethyl, propyl, isopropyl, hydroxyethyl, methoxyethyl, cyanoethyl or butyl, an aralkyl radical such as benzyl, an aryl radical such as phenyl, 3-chlorophenyl, 3-sulphophenyl, 1- or 2-naphthyl, a heterocyclic radical such as benzthiazolyl or thiadiazolyl, the cyano group, an alkoxycarbonyl or aryloxycarbonyl radical such as methoxycarbonyl or phenoxycarbonyl, an aminocarbonyl group such as aminocarbonyl, N-methylaminocarbonyl, N,N-dimethylaminocarbonyl, N-ethylaminocarbonyl, N,N-di-cyanoethylaminocarbonyl, N,N-dihydroxyethylaminocarbonyl, N-phenylaminocarbonyl or N,N-diphenylaminocarbonyl, an alkoxycarbonylmethyl or aryloxycarbonylmethyl radical such as methoxycarbonylmethyl or phenoxycarbonylmethyl, the cyanomethyl group, an acylmethyl group such as acetylmethyl, benzylcarbonylmethyl or benzoylmethyl, an aminocarbonylmethyl group such as N,N-dimethylaminocarbonyl methyl group, the carboxy group or the hydroxymethyl group.

Further suitable coupling components are bicyclic systems of formula (2)

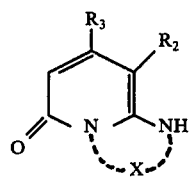
(2)

wherein R$_2$ and R$_3$ have the meanings given in the description of formula (1), and X represents a group —(CH$_2$)$_n$—, wherein n is 2 or 3, or represents a radical of the formula

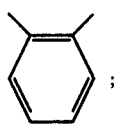

and of formula (3)

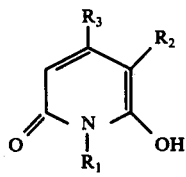
(3)

wherein R$_1$ has the meaning given in the explanation of formula (1), and R$_2$ and R$_3$ together with the carbon atoms of the pyridone ring to which they are bound represent a 5- or 6-membered ring, e.g. compounds of the formulae

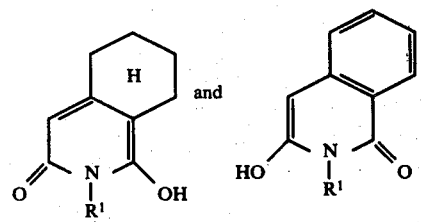

wherein R$_1$ has the meaning given in the explanation of formula (1), and H in the ring denotes the completely hydrogenated state of the ring concerned.

Also of importance are coupling components of formula (4)

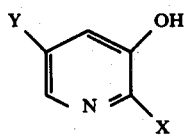
(4)

wherein X represents the hydroxy or amino group and Y a hydrogen or halogen atom, particularly a bromine atom.

Particularly interesting coupling components correspond to formula (1) and are preferably compounds containing sulpho groups. This applies especially to the following compounds:

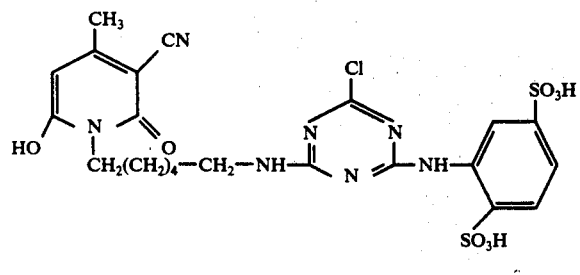

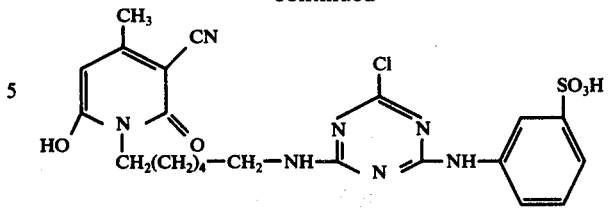

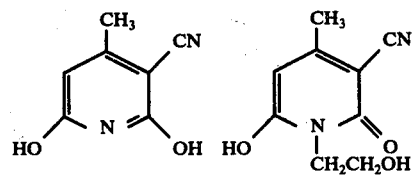

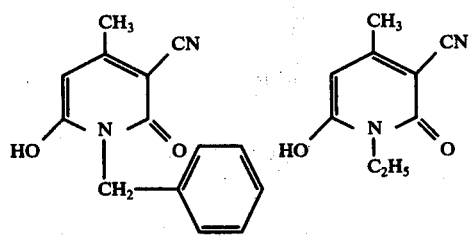

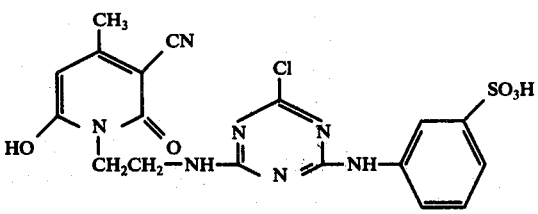

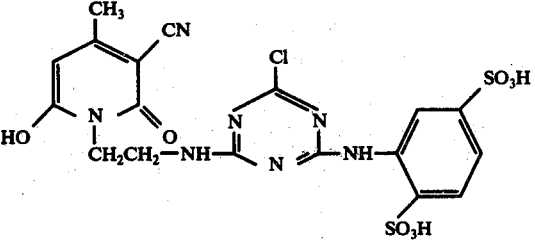

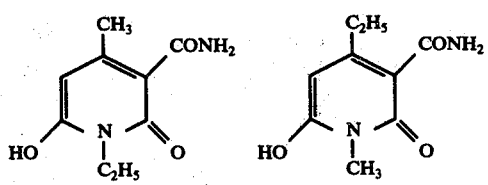

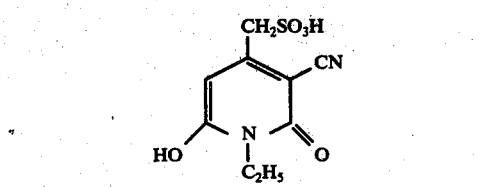

as well as to compounds of formulae (5) and (6)

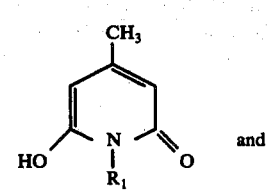
(5)

and

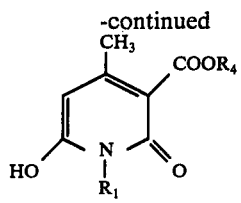

(6)

wherein $R_1$ has the meaning given in the explanation of formula (1), and $R_4$ represents an alkyl or aryl radical such as methyl, ethyl, β-ethoxyethyl or phenyl.

All these compounds can exist in several tautomeric forms. In order to simplify the description, these compounds are represented in only one of these tautomeric forms. It is, however, expressly emphasised that the description, here and in the following, and particularly in the claims, always relates to compounds in any one of these tautomeric forms.

These coupling components are for the most part known, or can be obtained by known methods; for example, as described in:

The Chemistry of Heterocyclic Compounds, Pyridine and its Derivatives Part I – IV, Interscience Publishers Inc., New York, Interscience Publishers Ltd., London; 1960 – 1964; also in: 'Berichte der Deutschen Chemischen Gesellschaft' 29, (1896), page 655, as well as in numerous patent specifications, e.g.: Brit. Patents Nos. 1,256,094, 1,256,095, Dutch Patent Specifications Nos. 71.06.678, 71.09.361, U.S. Pat. No. 3,471,506, German 'Offenlegungsschriften' Nos. 1,964,690, 2,022,817, 2,118,945, 2,123,061, 2,141,449, as well as the French 'Offenlegungsschriften' Nos. 2,025,723 and 2,027,586.

It is possible to use as diazo components required as second component for the synthesis of the dyestuff the aminoaryl compounds known from the chemistry of azo compounds, especially aminobenzenes and aminonaphthalenes. Particular suitable are also the commercial diazo components or their salts of the initially described naphthol process with respect to the process according to the invention.

The following are given as examples:
2- or 3-chloroaniline-hydrochloride,
2-, 3- or 4-nitroaniline,
2-methoxyaniline-hydrochloride,
2,5-dichloroaniline,
3,5-di-trifluoromethyl-aniline,
2-chloro-5-trifluoromethyl-aniline,
2-methoxy-5-chloro-aniline-hydrochloride,
2-methyl-3-chloro-aniline-hydrochloride,
2-methyl-5-chloro-aniline-hydrochloride,
2-methyl-4-chloro-aniline-hydrochloride,
2-nitro-4-chloro-aniline,
2-trifluoromethyl-4-chloro-aniline,
2-nitro-4-methyl-aniline,
2-nitro-4-methoxy-aniline,
2-nitro-4-ethoxy-aniline,
2-methyl-4- or -5-nitroaniline,
2-methoxy-4- or -5-nitroaniline,
2-ethylsulphonyl-5-trifluoro-methyl-aniline,
3-ethylsulphonyl-6-methoxy-aniline,
3-N,N-diethylamino-sulphonyl-6-methoxy-aniline,
3-N-n-butylaminosulphonyl-6-methoxy-aniline,
1,4-diamino-2,6-dichloro-benzene,
2,4-dimethyl-3-nitro-aniline,
2-methoxy-4-methyl-5-nitro-aniline,
2-chloro-4-cyano-5-methyl-aniline,
2,5-dimethoxy-4-cyano-aniline-hydrochloride,
4-phenylamino-aniline,
2-methoxy-4-phenylamino-aniline,
4-(4'-methoxy-phenylamino)-aniline-hydrosulphate
4',4'''-diamino-diphenylamine-hydrosulphate,
2-phenylsulphonyl-aniline,
2-(4'-chloro-phenoxycarbonyl)-aniline,
3-benzylsulphonyl-6-methoxy-aniline,
2,5-diethoxy-4-(2'-methyl-phenoxyacetylamino)-aniline,
2,5-dimethoxy-4-(4'-methyl-phenoxyacetylamino)-aniline,
2,5-diethoxy-4-(4'-methyl-phenoxyacetylamino)-aniline,
2-phenoxy-5-chloro-aniline,
2-(4'-chlorophenoxy)-5-chloro-aniline or aniline-hydrochloride,
4-aminoazobenzene,
4-aminoazobenzene-hydrochloride,
3-methoxy-4-aminoazobenzene,
2',3-dimethyl-4-aminoazobenzene-hydrochloride,
2,3'-dimethyl-4-aminoazobenzene-hydrochloride,
2,5-dimethoxy-4'-nitro-4-amino-azobenzene,
2-methyl-5-methoxy-4,4'-diamino-azobenzene,
2-ethyl-5-methoxy-4-amino-4'-chloro-azobenzene,
2-methyl-5-methoxy-4-amino-2'-nitro-4'-methyl-azobenzene,
2-amino-4-methoxy-5-methyl-2'-chloro-4'-nitro-azobenzene,
2,5-dimethoxy-4-amino-2'-N,N-dimethylaminocarbonyl-4'-nitro-azobenzene,
2,5-dimethoxy-4-amino-2',6'-dichloro-4'-nitro-azobenzene,
2-chloro-4-benzoylamino-5-methoxy-aniline,
2,4-dimethyl-5-benzoylamino-aniline,
2-N,N-diethylaminosulphonyl-4-benzoylamino-5-methoxy-aniline,
2-methoxy-4-benzoylamino-5-methyl-aniline
2,5-dimethoxy-4-benzoylamino-aniline,
2,5-diethoxy-4-benzoylamino-aniline, benzidine,
3,3'-dimethylbenzidine,
3,3'-dimethoxybenzidine,
4-(1'-naphthylazo)-aniline,
1-(2'-ethoxyphenylazo)-4-amino-naphthalene,
2-methyl-4-amino-5-ethoxy-4'-(4''-aminophenylamino)azobenzene,
1- or 2-aminonaphthalene,
3-benzoylamino-4-methoxy-aniline-hydrochloride,
1-amino-anthraquinone.

All these components, both the coupling and the diazo components, are used as solutions or suspensions, depending on the mode of application.

The actual process comprises (1) the "impregnation" ('Grundierung') of the organic material (to be dyed) with one of the two components of the developing dyestuff, e.g., with the coupling component; and (2) the "development", i.e. the coupling with the second component, e.g. with the diazo component, that is, with the diazotised "dye base" or the already diazotised "dye salt".

The coupling with such coupling components as defined is independent of the pH-value, i.e. it can be performed within a range of ca. pH 2 to 12, preferable at room temperature, so that this is possible not only in alkaline but also in neutral or acid medium, depending on the substrate.

A high substantivity of one of the two components is in some cases desired. This can be effected in the case of the coupling component by variation of the substituents in the heterocyclic system, e.g. by molecule enlargement or by incorporation of a fibre-reactive group. For the exhaust process, however, a lower substantivity is in general preferred since in the case of high substantivity a fabric to be dyed takes from the bath, in spite of a short immersion time, an amount of coupling component appreciably higher than that corresponding to the concentration in the liquor. This can lead to deficiencies which are reflected in an ultimate unevenness. In calico printing, the impregnation at the places where it is not printed with the thickened diazo solution must be easily removable by washing, e.g. by soaping in boiling solution, a property which also depends on the substantivity. The requirements in this case, therefore, are good solubility and low affinity to the fibres.

Impregnation and development can be effected simultaneously or successively in any desired order. Various methods of carrying out the said dyeing and printing process can be applied. With regard to dyeing, for example, the exhaust process from a long liquor, as well as semi- and fully-continuous processes, is suitable. The printing can be performed as a direct printing, reserve printing or discharge printing.

The procedure in the case of exhaust dyeing is, for example, as follows: impregnation with the coupling component, in certain cases in the presence of bath additives, e.g. protective colloids such as Turkey red oil, fatty acid/albumen condensates or sulphite liquor, metal-complex-forming agents, and salts such as sodium chloride or sodium sulphate; if necessary an intermediate rinsing in a cold sodium chloride bath; then removal of excess coupling component by centrifuging, filtration under suction or squeezing, or, depending on the substantivity of the coupling component, by rinsing in a sodium chloride solution, optionally intermediate drying; and development with the dye bases. The dye bases firstly have to be diazotised. This can be effected by the usual methods, e.g. by means of sodium nitrite and mineral acid, e.g. hydrochloric acid. Free amines are converted before diazotisation into their salts, if necessary by heating with moderately concentrated acid, which is diluted before diazotisation. The obtained diazo compounds are then coupled in an acid, neutral or alkaline aqueous medium with the coupling component. Instead of diazotised dye bases, it is also possible to use dye salts, i.e. stabilised diazonium compounds. Suitable stabilisers and precipitation reagents for the dye salts are: metal chlorides such as $ZnCl_2$, $CdCl_2$, $CoCl_2$ or $MnCl_2$, which can be precipitated with the diazo compound as a complex from the aqueous solution, aromatic sulphonic acids, which can be used as free acids or also as alkali salts, and which form with diazonium compounds pure salts, particularly naphthalenedisulphonic acids, hydrofluoroboric acid, which likewise forms with diazo compounds pure salts, acylamino-aryl-sulphonic acids such as acetylsulphanilic acid. In some cases, also the diazonium chlorides or acid sulphates themselves can be precipitated and used. The stabilised diazonium salts contain also inert salts. With the use of dye salts, an addition of alkali-binding agents, such as acetic acid, formic acid, sodium acetate/acetic acid, chromium acetate or mono- or disodium phosphate, is necessary where coupling is performed in alkaline solution, since dye salts are decomposed by alkali action. The addition of a dispersing agent is advantageous. The material impregnated with the coupling component as defined is not sensitive to air, so that an addition of stabilisers or the like to the impregnation bath is not necessary. The dyeing can receive an aftertreatment in the form of subsequent soaping with soap, or with a synthetic detergent, or dispersing agent and soda and a water-softening agent at 60° – 90° C. This aftertreatment produces better fastness to rubbing and also purer shades of colour.

In the case of dyeing by the continuous process, the material, e.g. piece goods, is slop-padded with the solution of the coupling component containing a protective colloid, and optionally a dispersing agent and a thickener, e.g. tragacanth. The material is intermediately dried and subsequently slop-padded with the solution of a diazotised dye base or dye salt. There is applied a passage of air, with development being then performed in a hot-water bath, by partial drying on drying cylinders or in a steam box. The aftertreatment is carried out on an open width washing machine or on a rope washing machine. In the dyeing of wool and natural silk, the development is preferably performed in acid solution buffered with mono- or disodium phosphate or with sodium acetate/acetic acid; and for the aftertreatment there is used a solution of detergent, water-softening agent and ammonia, or of detergent and acetic acid, at moderately elevated temperature or in a boiling bath. If necessary, e.g., in the dyeing of acetate silk, it is also possible to apply the coupling component together with the undiazotised dye base in the dispersed form to the fibres; diazotisation with sodium nitrite and hydrochloric acid and subsequent coupling are then performed, followed by rinsing and aftertreatment.

Direct printing can be carried out, for example, by a process in which the material is padded with the coupling component, whereby, on account of the subsequent removal of the coupling component from the unprinted areas, a low substantivity is necessary; evenly dried in a hot air drying machine or on a drying cylinder; printed with printing ink containing the thickened dye salt or dye base diazotised in the printing ink; and finally soaped in boiling soap solution. The printing can also be performed by a process in which the coupling component is printed onto the material; this dried; then padded with a solution of the diazo component; treated in a hot sodium bisulphite bath; and finally rinsed and soaped in a boiling soap solution.

A printing can also be obtained without impregnation of the material to be printed; in this case a mixture of coupling component and antidiazotate is printed onto the material, this dried, and the noncoupling antidiazotate converted into a coupling diazonium compound. This can be effected by fairly long exposure to air or steaming, and subsequent passage through a hot, electrolyte-containing bath with an addition of organic acid, e.g. formic acid or acetic acid.

Furthermore, it is possible to print with a mixture of coupling component and diazoamino compound, with the addition of a thickening agent and wetting agent. After drying, the stable diazoamino compound is converted by acid treatment — passage through a hot, electrolyte—containing bath with organic acid, or by steaming in acid vapour, into a coupling diazonium compound.

The printing according to the present invention may also be performed as a resist printing. In the case of white resists, for example, thickened aluminium sulphate is used as resist, if necessary with the addition of organic acids, such as tartaric acid. Coloured resists are producible, e.g. with reactive dyestuffs, vat dyestuffs, indigosoles, pigment dyestuffs or mordant dyestuffs.

The process according to the invention is also applicable in discharge printing. Used as white discharges are, e.g., thickening, Rongalit C, potash, anthraquinone, zinc white and an anion-active product for increasing tinctorial strength.

Colour discharges can be performed, e.g., with vat dyestuffs in the rongalite-potash process, with the addition of anthraquinone and an increased amount of Rongalit C.

With regard to the above described procedures for dyeing and printing, the sequence of application of the components can also be reversed, in that, instead of the coupling component, the diazo component is first applied to the fibres, the material impregnated or printed with the diazo component being then developed with the coupling component, e.g. by padding or printing-on. In some cases, however, both components can also be applied simultaneously to the fibres.

The preferred form of application is however the one whereby the material is impregnated with the coupling component and afterwards developed with the dye base.

If the dye base carries in the ortho-position with respect to the H$_2$N-group an HO-group or a substituent equivalent with regard to the metal-complex formation, and the coupling component likewise contains in the ortho-position with respect to the coupling point such a group, then it is also possible to obtain metal-complex dyestuffs. Metal-complex forming substituents are, for example, hydroxy, alkoxy, carboxy or analogous groups or halogen atoms. Also applicable are, e.g., nitrogen atoms which are constituents of a heterocyclic ring. The metal-complex formation can be effected simultaneously with the coupling or afterwards. Suitable complex-forming agents are heavy metals, particularly cobalt, nickel and copper. Metal-complexing can be performed in the development bath, which is then heated to boiling temperature in the second half of the development time. Alternatively, metal-complex formation can also be effected in the aftertreatment bath with an auxiliary complex of the metal salt. Subsequent metal-complexing can be carried out fully continuously.

There are obtained by the process developing dyestuffs of the azo series which contain, as radical of the coupling component, the defined 6-membered, heterocyclic radical having one ring nitrogen atom, the said process being excellent in that, in particular, it can be used without dependence on pH-values on the widest range of organic materials, and in that it is possible with it to produce with only one of the coupling components as defined the whole colour range from light yellow to black. It is also possible with the use of different diazo components to obtain, by application of a fabric pretreated with the coupling component and of various, e.g. electronically controlled, nozzles, differential dyeing effects.

Suitable organic materials to be dyed or printed according to the invention are natural and synthetic materials of the most varied kinds, such as leather and textile materials, cellulose materials, e.g. cotton, linen, viscose, natural silk; cellulose-2½- and triacetate, cellulose viscous (viscous rayon); polyamide materials such as wool, chlorinated wool or synthetic polyamide; polyester materials, especially textured ones; polyacrylonitrile materials; polyolefins, especially polypropylene materials; as well as, in particular, mixed fabrics such as that from, e.g. polyester/cotton or wool; cotton/wool or synthetic polyamide; wool/synthetic polyamide or polyacrylonitrile, whereby in the case of mixed fabrics there is the possibility of obtaining tone-in-tone dyeings or -printings.

These organic materials can be in the most diverse forms of processing, such as, for example, in the form of loose material, hank fabric, sliver (PAVENA), slubbing and cheeses.

The following examples illustrate the invention without limiting in any way its scope. Where not otherwise stated, parts are expressed in parts by weight; percentages are given as percent by weight; and the temperatures are in degrees Centigrade. The employed diazo components (amines) are used as diazo salts, advantageously in the form of stabilised diazonium salts.

EXAMPLE 1

A dye bath solution is prepared from 20 parts of the coupling component of the formula

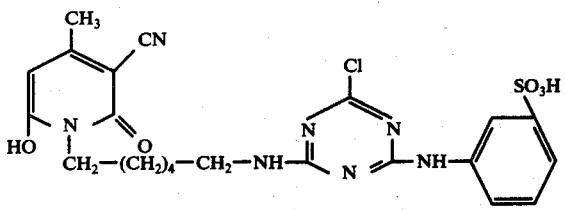

20 parts of Turkey red oil, 6 parts of sodium hydroxide solution 36° Be and 954 parts of hot water. Mercerised calico is impregnated with this solution on a three-roller foulard, squeezed out to 80 to 100% of the weight of the material and subsequently dried in a hot-air drying machine. The prepared and dried material is then printed on a screen printing machine, a roller printing machine or a rotary screen printing machine.

For the preparation of the printing inks, a stock thickening of 600 parts of a thickening agent, 50 parts of urea, 10 parts of acetic acid (80%) and 340 parts of water is produced. The printing ink is obtained by the sprinkling of 15 to 70 parts (depending on the depth of colour desired) of a diazo compound into 985 to 930 parts of the stock thickening as this is being agitated with a high speed stirrer. The material after printing is dried and subsequently washed.

After this operation there are obtained, with the diazo compounds of the aromatic amines (dye bases) given in column I of the following table, the shades listed in column II.

TABLE

| I<br>Dye base | II<br>Shade |
|---|---|
| 2-chloroaniline | yellow |
| 3-chloroaniline | yellow |
| 2-nitroaniline | yellow |
| 3,5-bis-trifluoromethylaniline | yellow |
| 2-methyl-5-nitroaniline | yellow |
| 2-methyl-4-chloroaniline | yellow |
| 2,5-dichloroaniline | yellow |
| 2-trifluoromethyl-4-chloroaniline | yellow |
| 2-nitro-4-methylaniline | yellow |
| 2-methyl-4-nitroaniline | yellow |
| 2-methoxy-5-nitroaniline | gold-yellow |
| 4-chloro-2-aminodiphenyl oxide | gold-yellow |
| 4,4'-dichloro-2-aminodiphenyl oxide | gold-yellow |
| 2-methoxy-5-chloroaniline | gold-yellow |
| 2-methoxy-4-nitroaniline | gold-yellow |
| 2,5-dimethoxy-4-cyanoaniline | orange |
| 2-nitro-4-methoxyaniline | orange |
| 2-methoxy-4-benzoylamino-5-methyl-aniline | red |
| 2-methyl-4-(2'-methylphenylazo)-aniline | red |
| 2-nitro-4'-amino-5'-methoxy-2',4-dimethyl-azobenzene | claret |
| 4-benzoylamino-2,5-methoxy-aniline | claret |

TABLE-continued

| I Dye base | II Shade |
| --- | --- |
| dianisidine | claret |
| 4-benzoylamino-2,5-diethoxy-aniline | claret |
| 4-phenylaminoaniline | blue |
| 2-methoxy-4-phenylaminoaniline | blue |
| 4-(4'-methoxy-phenylamino)-aniline | blue |
| 4-amino-2,5-dimethoxy-4'-nitro-azobenzene | black |
| 1-(2'-ethoxy-phenylazo)-4-aminonaphthalene | black |

The same results are obtained when a fabric made from chlorinated wool is used instead of mercerised cotton fabric.

If accompanying dyestuffs are present, e.g. reactive dyestuffs of the halotriazine type, then it is necessary after printing and drying that the reactive dyestuff be fixed by a steaming treatment for a further few minutes with subsequent washing.

EXAMPLE 2

A wool fabric is impregnated on a padding machine in the manner described in Example 1 and then dried. The dried material is subsequently dyed with a short air passage on the padding machine, and then washed and dried.

The dye bath is produced from 820 parts of cold water, 100 parts of a thickening agent, 10 parts of acetic acid (80%) and 15 to 70 parts of a diazo component.

The same diazo components as in Example 1 are used, whereby the same shades of colour as in the case of the printing process of Example 1 are obtained.

EXAMPLE 3

Wool fabric is dyed as in Example 2. The dyed and dried material is subsequently printed with a white discharge paste of the following composition: 500 parts of thickening agent, 150 parts of conc. hydrosulphite R (Hydrosulfit R), 200 parts of zinc white 1:1, 50 parts of an anion-active product for increasing the yield, 30 parts of potassium carbonate, 40 parts of anthraquinone (30%) and 30 parts of water.

After discharge, the fabric is dried, steamed and washed. All dyeings obtainable according to Example 2 are dischargeable to a white.

If there is used, instead of the above described white discharge paste, the colour discharge paste of the following composition: 70 parts of 2,8-diphenylanthraquinone-dithiazole, 80 parts of glycerin, 30 parts of an anion-active product for increasing yield, 300 parts of British gum + stock thickening (see Example 1) 1:1, 200 parts of printing thickening, 100 parts of potassium carbonate, 125 parts of Hydrosulfit R (conc.) and 95 parts of water, then a yellow discharge printing is obtained.

All dyeings obtained according to Example 2 are dischargeable to a colour with the above described colour discharge paste, or with corresponding pastes containing dyestuffs other than 2,8-diphenylanthraquinone-dithiazole.

EXAMPLE 4

A dye bath is prepared from 4.6 parts of 2,3-dihydroxy-5-bromopyridine, 6 parts of sodium hydroxide solution 36° Be, 20 parts of Turkey red oil and 970 parts of hot water. A mercerised cotton fabric is impregnated with this solution on a three-roller padding machine, squeezed out to 100% of the weight of material and dried in hot air.

The pretreated fabric is impregnated on a second padding machine with a solution containing per liter: 4 parts of 8-aminoquinoline in the form of the diazonium compound obtained in the usual manner, 5 parts of a dispersing agent and 30 parts of a 50% acetic acid. After an air-passage, without intermediate drying, the fabric is given an aftertreatment for 15 minutes at a temperature of 95 to 98° in a solution of 2.5 parts of crystallised copper sulphate, 10 parts of sodium hydroxide solution 38° Be and 3 parts of tartaric acid in 990 parts of water. The cotton fabric now dyed in an intense dark-blue shade is finally soaped, rinsed and dried in the usual manner. The dyeing has good fastness to wet processing and to light.

If there is used, for subsequent metallisation, 2.5 g of cryst. nickel sulphate or 2.8 g of cryst. cobalt sulphate, with otherwise the same procedure, then the resulting dyeing is in a navy blue or green-blue shade.

EXAMPLE 5

A bleached cotton fabric is immersed in an aqueous solution containing 20 g/l of the coupling component of the formula

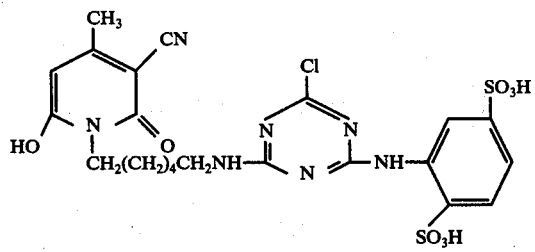

as well as 30 g/l of Turkey red oil and 2 cm³/l of sodium hydroxide solution 36° Be; the fabric is then squeezed out to 30% moisture content and subsequently dried. The fabric pretreated in this manner is printed on a flat screen printing machine with a three-colour design in cross stripes. Three printing pastes are used for this purpose; they are obtained by the dissolving respectively of a. 40 g of the compound of the formula

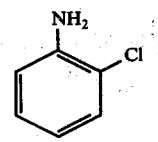

b. 50 g of the amine of the formula

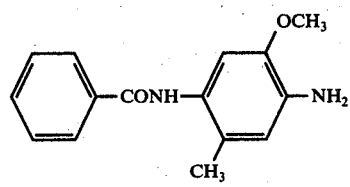

and c) 70 g of the amine of the formula

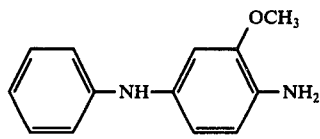

and 50 g of urea in 340 g of water, 10 g of 80% acetic acid and 600 g of a predissolved flour-thickening agent having a solid matter content of 6%.

Printing is followed by a drying operation at a temperature of 120° in the drying apparatus normally arranged next to the drying apparatus. Without any further operation the printed fabric is then washed for removal of excess dyestuff, this being performed firstly cold, then hot at 90° to 100° in a solution containing 2 g/l of sodium carbonate and 2 g/l of a wetting agent, and subsequently again cold; and the material is finally dried.

There is obtained a deeply coloured, brilliant printing having yellow, red and blue stripes.

EXAMPLE 6

A suitable absorbent, cleaned fabric made from viscose spun rayon is printed on a table by hand with a stencil containing a one-colour design; the printing paste used for this purpose is prepared from 20 g of the coupling component according to Example 1, dissolved in 30 g of Turkey red oil, 6 cm³ of sodium hydroxide solution 36° Be, 50 g of urea and 400 g of water. In order to increase viscosity, this solution is mixed with 494 g of a 6% solution of alkali-resistant sodium alginate in water. With application of a high-speed stirrer, there is then added to this paste 30 g of the dyestuff of the formula

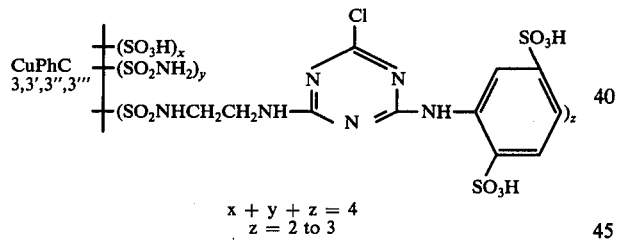

$$x + y + z = 4$$
$$z = 2 \text{ to } 3$$

After printing, drying is carried out at the temperature existing in the printing room, and the material afterwards treated, for the purpose of fixing the printing, in an atmosphere of saturated steam at 100° for 10 minutes. Before the washing out of excess dyestuff, which is performed as in Example 5, the fabric is immersed in a solution composed of 40 g of the compound of the formula

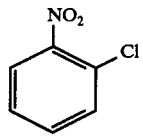

30 g of urea and 10 g of acetic acid (80%) dissolved in 920 g of water. There results a printing in a brilliant green shade of colour.

EXAMPLE 7

A well cleaned knitted fabric made from textured polyester is treated, as described in Example 5, with an aqueous solution containing 20 g/l of the coupling component of the formula

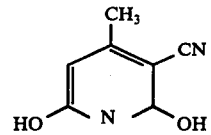

as well as 30 g/l of Turkey red oil and 8 cm³ of sodium hydroxide solution 36° Be. A single coloured design is printed on a rotary screen printing machine. The following printing paste is used:

70 g of the amine of the formula

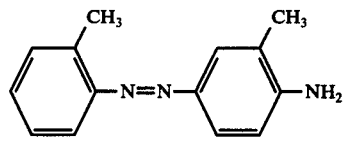

320 g of water, 50 g of urea, 10 g of acetic acid (80%) and 550 g of flour thickening.

After printing and drying, a fixing operation is carried out, for the purpose of fixing the formed dyestuff, with hot air at 200° for 50 seconds, and the material subsequently washed for removal of excess dyestuff, as in Example 5.

An intensely brilliant red shade is obtained.

EXAMPLE 8

A fabric, prepared in the usual manner for printing, consisting of cellulose-2½-acetate, is treated with the following solution, as in Example 7: 20 g of the coupling component of the formula

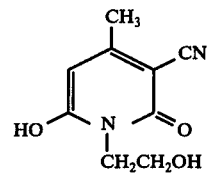

30 g of Turkey red oil and 950 g of water.

Printing is performed as described in Example 7.

After printing and drying, the material is treated in saturated steam at 100° for 20 minutes; it is afterwards rinsed cold, then warm, and again cold and finally dried.

There is obtained an intensely red shade.

EXAMPLE 9

A cellulose triacetate fabric is well cleaned and prepared as in Example 7, but with the use of the following treatment solution: 20 g of the coupling component of the formula

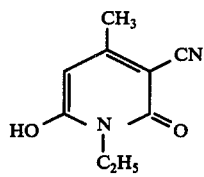

30 g of Turkey red oil, 8 cm³ of sodium hydroxide solution 36° Be and 940 g of water. This fabric is printed as described in Example 7 with application, however, of 30 g/kg of the amine of the formula

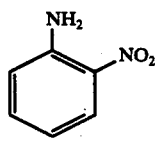

instead of the amine used in Example 7. After being printed, the material is dried and subsequently treated in a steam atmosphere of saturated steam at 1.5 atm. for 20 minutes It is afterwards washed out in a manner analogous to that in Example 7.

There is obtained an intensely yellow shade of colour.

EXAMPLE 10

A pure wool fabric having a m²-weight of 120 g is preliminarily cleaned in the usual manner and treated with, relative to the weight of material, 2% of active chlorine; the material is then subjected to a special preparation treatment and, after appropriate fixing, printed on the so-called printing table by hand with blocks to obtain a single-colour design, with use of the following printing paste:

70 g of the amine of the formula

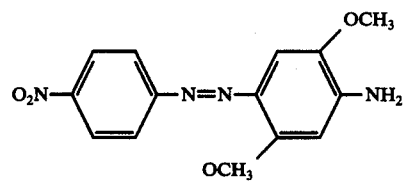

560 g of a flour-thickener derivative, 50 g of urea, 10 g of acetic acid (80%) and 310 g of water.

Drying is performed at room temperature; the material is then fixed in saturated steam at 100°; it is afterwards washed out first cold, then at 50° with the use of 2 g/l of a wetting agent, and finally again cold.

An even, deep chestnut brown shade is obtained.

The above mentioned special treatment is as follows: The fabric is continuously immersed in a solution of 20 g/l of the coupling component of the formula

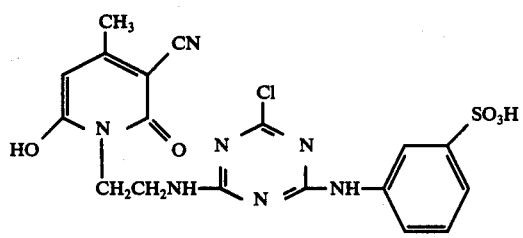

30 g/l of Turkey red oil, 4 cm³/l of sodium hydroxide solution 36° Be, and subsequently squeezed out between two rollers to give a liquid-absorption value of 100%. The pH-value of the solution should be 3.

If leather is used in the above example instead of wool, with otherwise the same procedure, but without the preliminary treatment with active chlorine, then a similarly good result is obtained.

EXAMPLE 11

A natural silk fabric having an m² weight of ca. 70 g is pretreated in the normal manner for printing, and subsequently printed with a printing paste on the screen printing table with stencils with a single-colour pattern consisting of geometrical designs. The printing paste has the following composition: 20 g of the coupling component according to Example 4 is dissolved in 30 g of Turkey red oil, 12 cm³ of sodium hydroxide solution 36° Be, 50 g of urea and 400 g of water. There is also added 490 g of sodium alginate thickening.

The printed article is dried at room temperature, and then overprinted by means of zinc stencils and a conventional spray gun, by the spray printing method, with a second single-colour pattern. This spray printing paste has the following composition: 40 g/kg of an amine of the formula

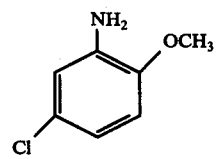

200 g of a thickener-solution, 50 g of urea, 10 g of acetic acid and 700 g of water.

Drying is performed again after this operation; the material is subsequently further treated as described in Example 10 and then finished. There is obtained a claret shade.

EXAMPLE 12

A polyamide knitted fabric having a m² weight of 150 g is printed, after preliminary cleaning, on a roller printing machine with a two-colour pattern with application of the following printing pastes:

printing paste 1:
20 g of the coupling component of the formula

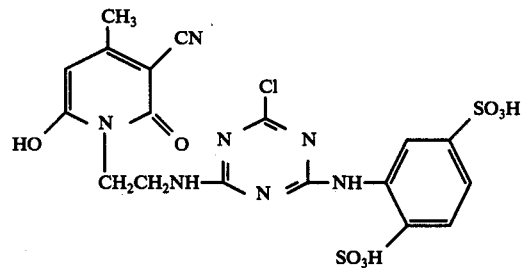

is dissolved in 30 g of Turkey red oil, 2 cm³ of sodium hydroxide solution 36° Be, 50 g of urea and 400 g of water. This solution is thickened with a sodium alginate solution of 490 g in weight and a viscosity of ca. 30,000 cP;

printing paste 2:
20 g of the coupling component according to Example 4 is dissolved in 30 g of Turkey red oil, 12 cm³ of sodium hydroxide solution 36° Be, 50 g of urea and 400 g of water. This solution is thickened with printing paste 1.

After being dried and then steamed for 20 minutes with saturated steam, the knitted fabric in the wide width is treated for 10 seconds at room temperature in a solution of 50 g/l of the amine of the formula

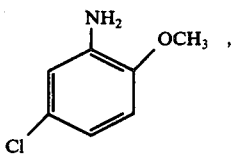

50 g/l of urea, 10 g/l of acetic acid; it is then rinsed cold, subsequently soaped at 50° with the use of 2 g/l of a non-ionic detergent, and finally again rinsed cold. There is obtained a printing with designs in an orange and violet shade.

EXAMPLE 13

A polyacrylonitrile knitted fabric of 200 g/m² in weight is washed as hank at 40° to 50° with a non-ionic detergent with pH 6, and dried on a stretching frame. As preparation for a subsequent printing, the knitted fabric is immersed in a solution of the following composition: 20 g/l of the coupling component according to Example 7, 30 g/l of Turkey red oil and 8 cm³/l of sodium hydroxide solution 36° Be. The knitted fabric is then pressed out to give a resulting moisture absorption of ca. 100%. After a drying operation at 80° to 90°, a single-colour design is printed on a rotary screen printing machine with a printing
paste of the following composition:
70 g of the amine of the formula

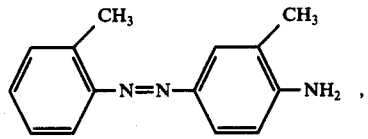

310 g of water, 10 g of acetic acid, 50 g of urea and 560 g of flour thickening.

After drying, the material is treated with a star steamer for 30 minutes with saturated steam without excess pressure; it is subsequently washed cold, then warm at 50° and again cold. The result is a brilliant red shade.

EXAMPLE 14

A fabric made from polypropylene instead of polyacrylonitrile is treated by a procedure analogous to that described in Example 13. There is thus obtained a shade of red.

EXAMPLE 15

A mixed fabric consisting of 67% of polyester and 33% of cotton is immersed in an aqueous solution containing 20 g/l of the coupling component according to Example 5, 20 g/l of the coupling component according to Example 7, 30 g/l of Turkey red oil and 8 cm³/l of sodium hydroxide solution 36° Be; the material is squeezed out to obtain a moisture content of 80 to 100%; it is then dried at 100° to 120° and afterwards printed on a roller printing machine with a stripe pattern, the printing paste used having the following composition:
30 g of the amine of the formula

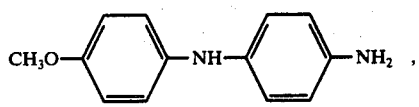

50 g of urea, 10 g of acetic acid (80%), 330 g of water and 580 g of thickener.

The material is dried and then treated for 60 seconds at 200° to effect the fixation of the prints. This is performed on rotating, suitably heated copper cylinders by direct contact. The material is subsequently washed in the normal manner, i.e. cold, then hot at 60° with an ethylene oxide product, and again cold. There is obtained in this manner a deep blue shade.

EXAMPLE 16

A mixed fabric consisting of 50% of cellulose-viscose (viscose rayon) and 50% of polyester is preliminarily treated analogously to Example 15 with application of an aqueous solution containing 20 g/l of the coupling component according to Example 5, 20 g/l of the coupling component according to Example 8, 30 g/l of Turkey red oil and 2 cm³/l of sodium hydroxide solution 36° Be. The printing is performed in the same manner as in Example 15, the printing paste having in this case the following composition:
50 g of the amine of the formula

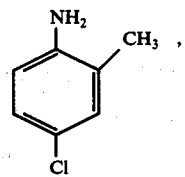

50 g of urea, 10 g of acetic acid (80%), 320 g of water and 570 g of thickening agent.

After conventional drying, fixing is performed in superheated steam under atmospheric pressure at 190° for 8 minutes; the material is afterwards washed and dried as described in Example 15.

There results a gold-yellow shade.

EXAMPLE 17

A mixed fabric consisting of 50% of cotton and 50% of wool is preliminarily treated analogously to Example 15 with use of an aqueous solution of 20 g/l of the coupling component according to Example 5, 30 g/l of Turkey red oil and 4 cm³/l of sodium hydroxide solution 36° Be. The printing is performed in the same manner as in Example 15, the printing paste having in this case the following composition:
30 g of an amine of the formula

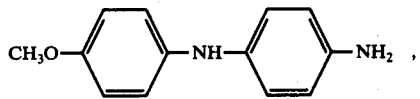

50 g of urea, 10 g of acetic acid (80%), 330 g of water and 580 g of thickening agent. After drying, the material is fixed in saturated steam at atmospheric pressure; it is rinsed cold, then warm at 40° to 50° and again cold, and finally dried.

There is obtained a printing in a deep blue shade.

EXAMPLE 18

A mixed fabric consisting of 50% of cotton and 50% of polyamide is prepared analogously to Example 15 with application of an aqueous solution containing 20 g/l of the coupling component according to Example 5, 30 g/l of Turkey red oil and 4 cm³/l of sodium hydroxide solution 36° Be.

The printing is performed as in Example 15, the printing paste having in this case the following composition: 70 g of an amine of the formula

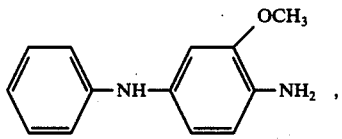

50 g of urea, 10 g of acetic acid, 290 g of water and 580 g of thickener.

The material is finished as in Example 17 to obtain a printing of a deep blue shade.

EXAMPLE 19

A mixed fabric consisting of 50% of cotton and 50% of polyamide is preliminarily treated analogously to Example 15 with application of an aqueous solution containing 20 g/l of the coupling component according to Example 9, 30 g/l of Turkey red oil and 4 cm³/l of sodium hydroxide solution 36° Be.

The printing is performed as in Example 15, whereby the printing paste has the following composition: 50 g of an amine of the formula

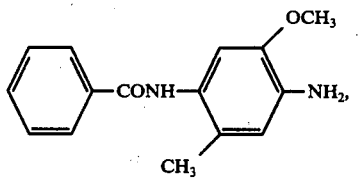

50 g of urea, 10 g of acetic acid, 310 g of water and 580 g of thickener.

The material is finished as in Example 17 to obtain in this case a printing of a deep red shade.

EXAMPLE 20

A mixed fabric consisting of ⅔ polyester and ⅓ wool is preliminarily treated analogously to Example 15 with application of an aqueous solution containing 20 g/l of the coupling component of the formula

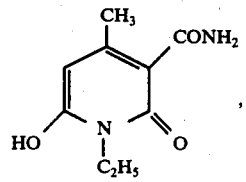

30 g/l of Turkey red oil and 6 cm³/l of sodium hydroxide solution 36° Be.

The printing is performed as in Example 15, whereby the printing paste in this case has the following composition: 40 g of an amine of the formula

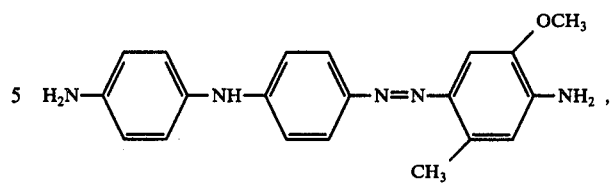

50 g of urea, 10 g of acetic acid, 320 g of water and 580 g of thickening agent.

The material is finished as in Example 17 to obtain a printing of a deep brown shade.

EXAMPLE 21

A mixed fabric consisting of 50% of wool and 50% of polyamide is preliminarily treated analogously to Example 15 with application of an aqueous solution containing 20 g/l of the coupling component of the formula

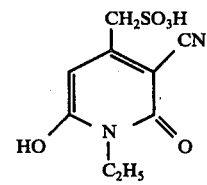

30 g/l of Turkey red oil and 6 cm³/l of sodium hydroxide solution 36° Be.

The printing is performed as in Example 15, the printing paste in this case having the following composition: 60 g of an amine of the formula

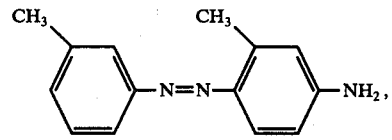

50 g of urea, 10 g of acetic acid, 300 g of water and 580 g of thickener.

The material is finished as in Example 17 to obtain in this case a printing of a deep orange shade.

EXAMPLE 22

A mixed fabric consisting of equal parts of wool and polyacrylonitrile is preliminarily treated analogously to Example 15 with application of an aqueous solution containing 20 g/l of the coupling component according to Example 7, 30 g/l of Turkey red oil and 6 cm³/l of sodium hydroxide solution 36° Be.

The printing is performed as in Example 15, with the printing paste having in this case the following composition: 50 g of an amine of the formula

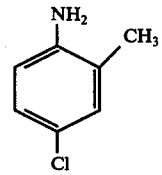

50 g of urea, 10 g of acetic acid, 300 g of water and 590 g of thickener.

The material is finished as in Example 17 to obtain a printing of a brilliant gold-yellow shade.

We claim:

1. A process for dyeing and printing leather, cotton or wool material, comprising the step of applying to leather, cotton or wool material a diazonium salt and a coupling component which react on the material to produce a diazo dyestuff, wherein the coupling component is selected from the group consisting of:

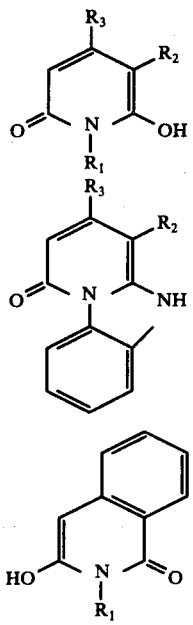

wherein

R₁ is hydrogen, an alkyl group, an acylaminoalkyl group, an aralkyl group, an aryl radical, a heterocyclic radical, an alkylene radical which links the radical of the elected formula with a further similar heterocyclic radical, or an amino group;

R₂ is hydrogen, an alkyl group, cyclohexyl, cyano nitro, nitroso, H₂N—, acylamino group, an alkylcarbonyl or arylcarbonyl group, a sulphonyl group, an aminosulphonyl group, an alkoxycarbonyl or aryloxycarbonyl radical, an aminocarbonyl group, a halogen atom, a sulphoalkyl group, a haloalkanoylaminomethyl group, a quaternary ammoniumalkanoylaminomethyl group, a sulfoalkanoylaminomethyl group, a phthalimidomethyl group, an o-benzene disulfonimidomethyl group, a sulfonic acid group, a carboxyl group, a quaternized amino group, a pyridinium group or a benzimidazolium group;

R₃ is hydrogen, an alkyl group, an aralkyl radical, an aryl radical, a heterocyclic radical, the cyano group, an alkoxycarbonyl or aryloxycarbonyl radical, an aminocarbonyl group, an alkoxycarbonylmethyl or aryloxycarbonylmethyl radical, the cyanomethyl group, an acylmethyl group, an aminocarbonylmethyl group, the carboxy group or the hydroxymethyl group;

n is 2 or 3;

wherein one of R₁ and R₂ is a fiber-reactive group provided that every selected coupling component has one fiber-reactive group.

2. The process of claim 1, wherein the coupling compound is of the formula

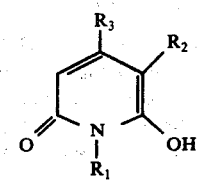

3. The process of claim 2, wherein the coupling component is selected from those of the formulae:

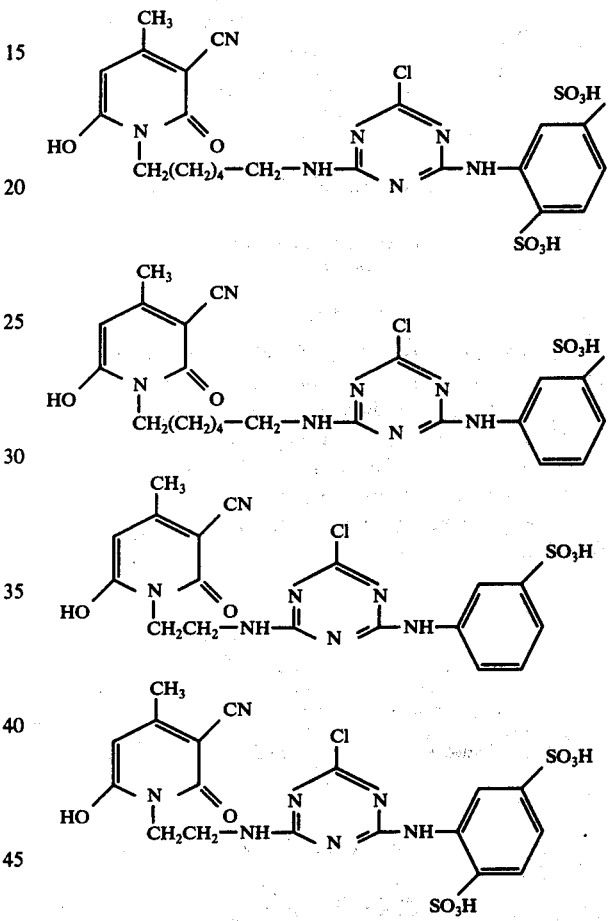

4. The process of claim 1, wherein the diazonium salt is of the aminobenzene or aminonaphthylene series.

5. The process of claim 1, wherein the leather, cotton or wool is first printed with the coupling component and subsequently with the diazonium salt.

6. The process of claim 1, where R₁ is selected from the group consisting of chloroacetylaminomethyl, α,β-dipropionylaminoethyl and 2,4-dichlorotriazinyl-(6)-aminoethyl, or R₂ is selected from the group consisting of chloroacetylamino, α-bromoacryloylamino, α,β-dibromopropionylamino, 2,4,5-trichloropyrimidyl-(6)-amino, 2,6-difuloro-5-chloropyrimidyl-(4)-amino, 2,2,3,3-tetrafluorocyclobutyl-(1)-carbonylamino, 2,2,3,3-tetrafluorocyclobutyl-(1)-acryloylamino, 2,4-dichlorotriazinyl-(6)-amino or 2-chloro-4-amino-triazinyl-(6)-amino.

7. Process according to claim 1 wherein coupling component is of the following formulae:

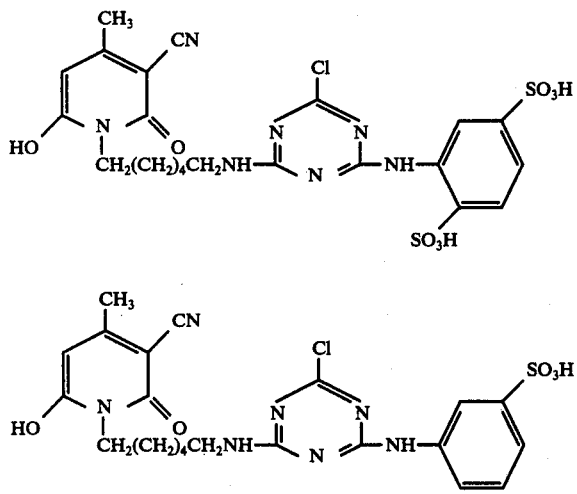
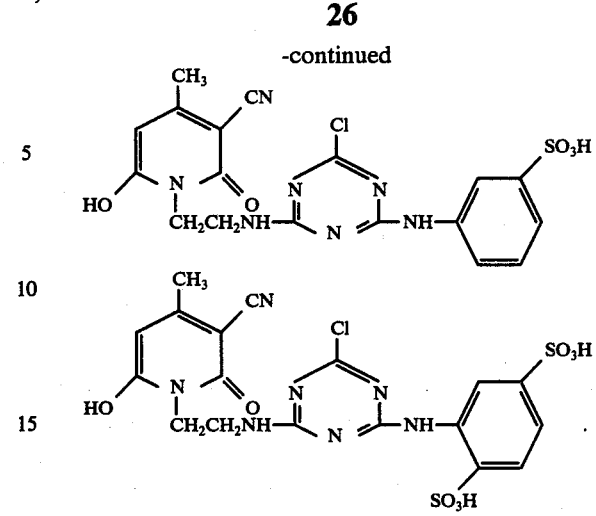
8. The leather, cotton or wool dyed or printed according to the process of claim 1.
* * * * *